US008788760B2

(12) United States Patent
DeCusatis et al.

(10) Patent No.: US 8,788,760 B2
(45) Date of Patent: Jul. 22, 2014

(54) ADAPTIVE CACHING OF DATA

(75) Inventors: Casimer M. DeCusatis, Poughkeepsie, NY (US); Rajaram B. Krishnamurthy, Wappingers Falls, NY (US); Todd A. Nelson, Cedar Park, TX (US); Anuradha Rao, Hopewell Junction, NY (US); Joseph H. Torella, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 12/621,189

(22) Filed: Nov. 18, 2009

(65) Prior Publication Data

US 2011/0119444 A1 May 19, 2011

(51) Int. Cl.
*G06F 12/08* (2006.01)

(52) U.S. Cl.
CPC .................................. *G06F 12/0815* (2013.01)
USPC ........................................................ 711/141

(58) Field of Classification Search
CPC ............................ G06F 12/08; G06F 12/0897
USPC .......................... 711/117–154, 156
See application file for complete search history.

(56) References Cited

U.S. PATENT DOCUMENTS

2002/0116582 A1* 8/2002 Copeland et al. ............. 711/133
2008/0298235 A1* 12/2008 Neugebauer .................. 370/232

OTHER PUBLICATIONS

Martin, Milo MK, et al. "Using destination-set prediction to improve the latency/bandwidth tradeoff in shared-memory multiprocessors." Computer Architecture, 2003. Proceedings. 30th Annual International Symposium on. IEEE, 2003.*

* cited by examiner

*Primary Examiner* — April Y Blair
*Assistant Examiner* — Nicholas Simonetti
(74) *Attorney, Agent, or Firm* — Steven Chiu, Esq.; Blanche E. Schiller, Esq.; Heslin Rothenberg Farley & Mesiti P.C.

(57) ABSTRACT

Data access is facilitated by employing local caches and an adaptive caching strategy. Specific data is stored in each local cache and consistency is maintained between the caches. To maintain consistency, adaptive caching structures are used. The members of an adaptive caching structure are selected based on a sharing context, such as those members having a chosen association identifier or those members not having the chosen association identifier.

20 Claims, 12 Drawing Sheets

ADAPTIVE CACHING OF DATA

BACKGROUND

This invention relates, in general, to processing within a computing environment, and in particular, to facilitating data access within the computing environment.

In certain systems, such as product lifecycle management (PLM) systems, data integration is becoming important for end-to-end business process execution. Data is integrated from multiple disparate data sources in a single portal graphical user interface (GUI) using, for instance, Service Oriented Architecture (SOA) technology. While it is convenient to search, read and edit data from different data sources in a single GUI, the performance of these operations is impacted due to data source location, user geographies, etc. As corporate organizations spread and integrate across national and international boundaries, increasing number of users located across geographies are concurrently working on shared data sets.

Users in geographies away from the data source geography experience performance issues. Performance is especially impacted when edits (data load, modifications, inserts, and deletes) are executed. This is because time is spent going to the root server for each search and edit, commit/update and in acquiring locks for exclusive access to data. Web page caching may improve performance, but this works only for reads. This does not result in improved performance for new update, delete and modify scenarios.

BRIEF SUMMARY

Data access is facilitated by caching integrated data in local caches enabling faster access to the data. Since the data is in local caches, consistency is to be maintained between the local caches and central server. To maintain consistency, adaptive caching structures are used to communicate changes to the data. The caches included in a particular caching structure are selected based on a data sharing context.

The shortcomings of the prior art are overcome and additional advantages are provided through the provision of a computer program product for facilitating data access in a computing environment. The computer program product includes a storage medium readable by a processing circuit and storing instructions for execution by the processing circuit for performing a method. The method includes, for instance, adaptively creating a caching structure usable in communicating with one or more caches of the computing environment, the one or more caches to be included in the caching structure being selected based on a data sharing context; and using the caching structure to provide an indication of a change to the one or more caches, wherein the indication is based on a type of the caching structure.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
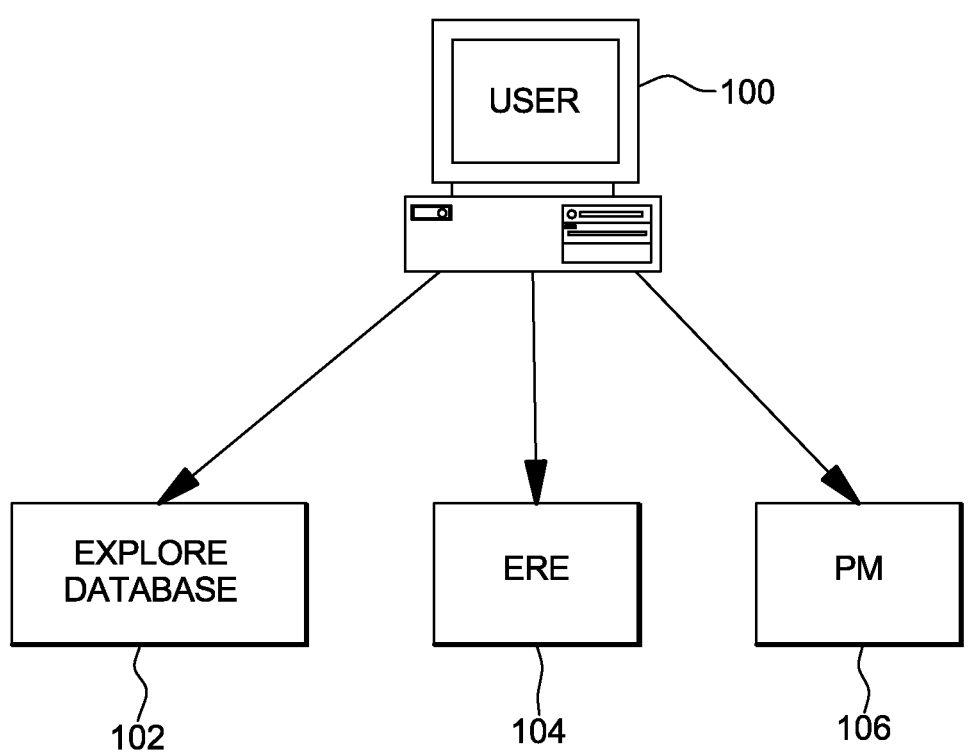
FIG. 1 depicts one embodiment of a user accessing a plurality of separate databases.

Many companies, including International Business Machines Corporation, use various different databases to manage, through their lifecycle, the many parts and products that they use and produce. For example, as shown in FIG. 1, a user 100 may search three different databases: an eXplore database 102 for part parameters; an ERE database 104, which is a document repository; and a product manager (PM) database 106 for bill of materials and product structure, in order to execute particular business scenarios. This requires a user to use three different user ids and passwords.

Figure 2:
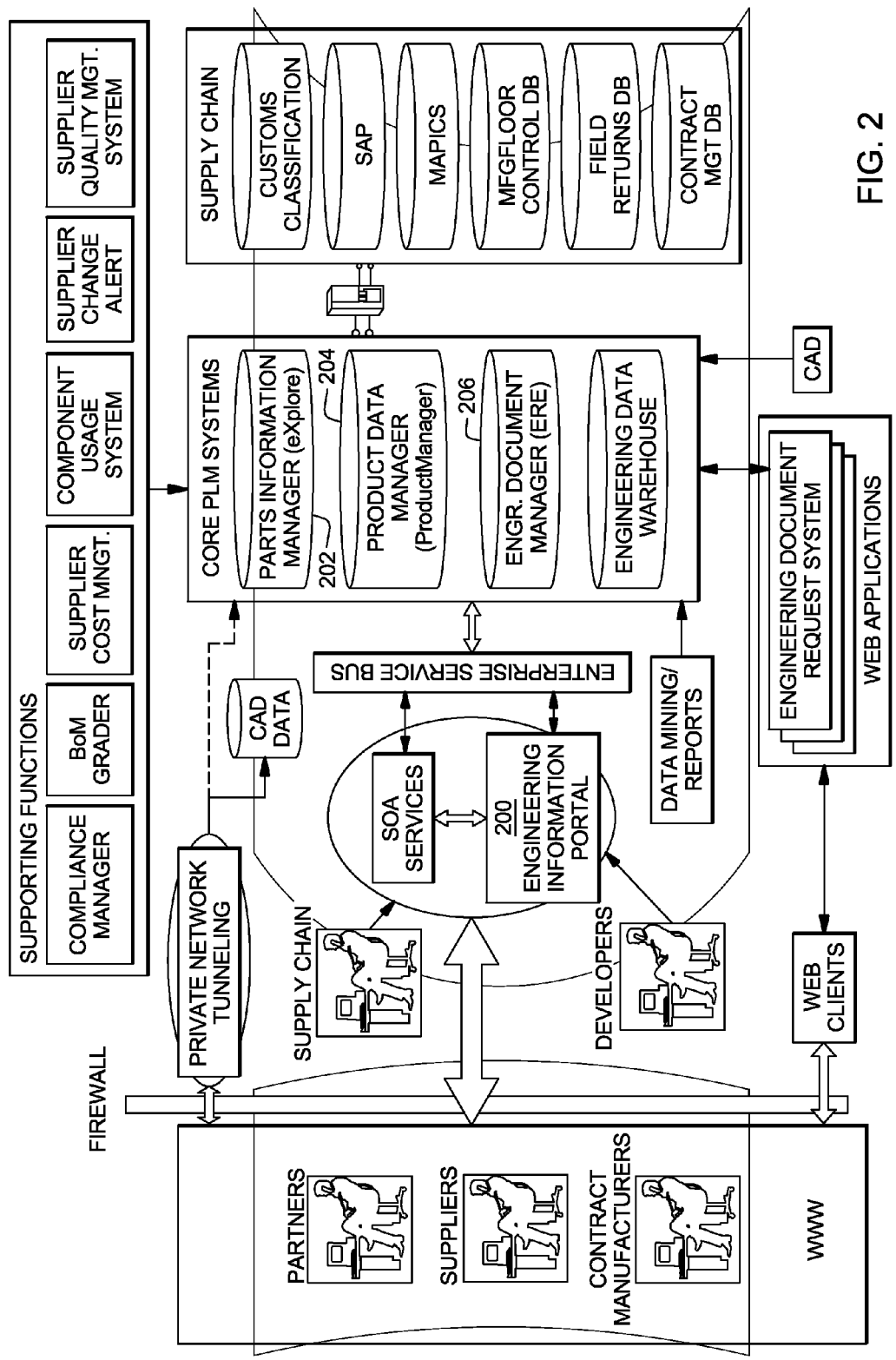
FIG. 2 depicts one example of a system using an engineering information portal to integrate data, in accordance with an aspect of the present invention.

Although separate databases have been and continue to be used by companies, emphasis is being placed on data integration. Data integration integrates data from multiple disparate data sources into a single portal graphical user interface (GUI). One example of such a portal, used for instance, by International Business Machines Corporation, is an engineering information portal (EIP). As shown in FIG. 2, EIP 200 is a portal based application that integrates data from multiple, disparate back-end data sources (e.g., eXplore 202, PM 204, and ERE 206); uses a single user interface to access the disparate databases with a single sign-on; adapts to users roles and behavioral habits to present search and result views;

facilitates one stop search for part information and enhances the user experience and productivity; is extensible to integration of future data sources; and uses service oriented architecture (SOA) technology to simplify the information technology (IT) landscape.

Data integration provides convenience in searching, reading, and editing data from different data sources; however, performance of these operations is impacted. This is especially true for users located in a geography other than the geography of the data source that is attempting to perform updates on the data. Thus, in accordance with aspects of the present invention, data access is facilitated by employing local caches and using an adaptive caching strategy. It may also be facilitated by preloading data and prospectively creating the cache structures. Specific data is stored in each local cache, based, for instance, on access control, security and/or privacy, and consistency is maintained between these caches and central server.

To maintain consistency and improve performance and efficiency, adaptive caching structures are used. In one example, there are different adaptive caching structures. For instance, one adaptive caching structure includes one or more members (e.g., nodes, caches) selected based on a sharing context, such as a chosen association identifier. That is, this adaptive caching structure includes members with the same association identifier. Another adaptive caching structure includes members (e.g., nodes, caches) having association identifiers other than the chosen identifier.

The different caching structures are used for different operations. For instance, in one embodiment, the caching structure with members of the same association identifier is used to provide cache updates, referred to herein as the update caching structure; and the caching structure with the association identifiers other than the chosen identifier is used for cache invalidates, referred to herein as the invalidate caching structure. In one example, both structures are used. For instance, if an update to the database is performed, the update caching structure is used to provide an indication of the update to other members of the update caching structure; and the invalidate data structure is used to inform those not updating the database of the change.

In one example, each caching structure is a distributed structure. However, in other embodiments, the caching structure is not distributed.

In further embodiments, the sharing context includes other criteria, such as access control. For instance, the members selected to be in the cache are all members with update access to the same part of the data structure (i.e., for the same association id). Those nodes reading the same part of the data structure (i.e., same association id), but do not have update access are excluded from the update caching structure. For instance, assume a caching structure is created that includes a plurality of members updating a particular part of the database having a given association id, e.g., a.b.c.d, and assume another member wishes to update that part of the database. Although the member would be updating that same part of the database, it may be denied update access, and thus, not included in the caching structure. This may be because allowing the member to be a part of the update structure may negatively affect the update time (e.g., member in a different geography too far away). Therefore, in this situation, this member is added to the invalidate caching structure, which would now include members with an association id different than the chosen association id and those with the same association id, but without an acceptable access control. Other criteria may also be used.

Figure 3A:
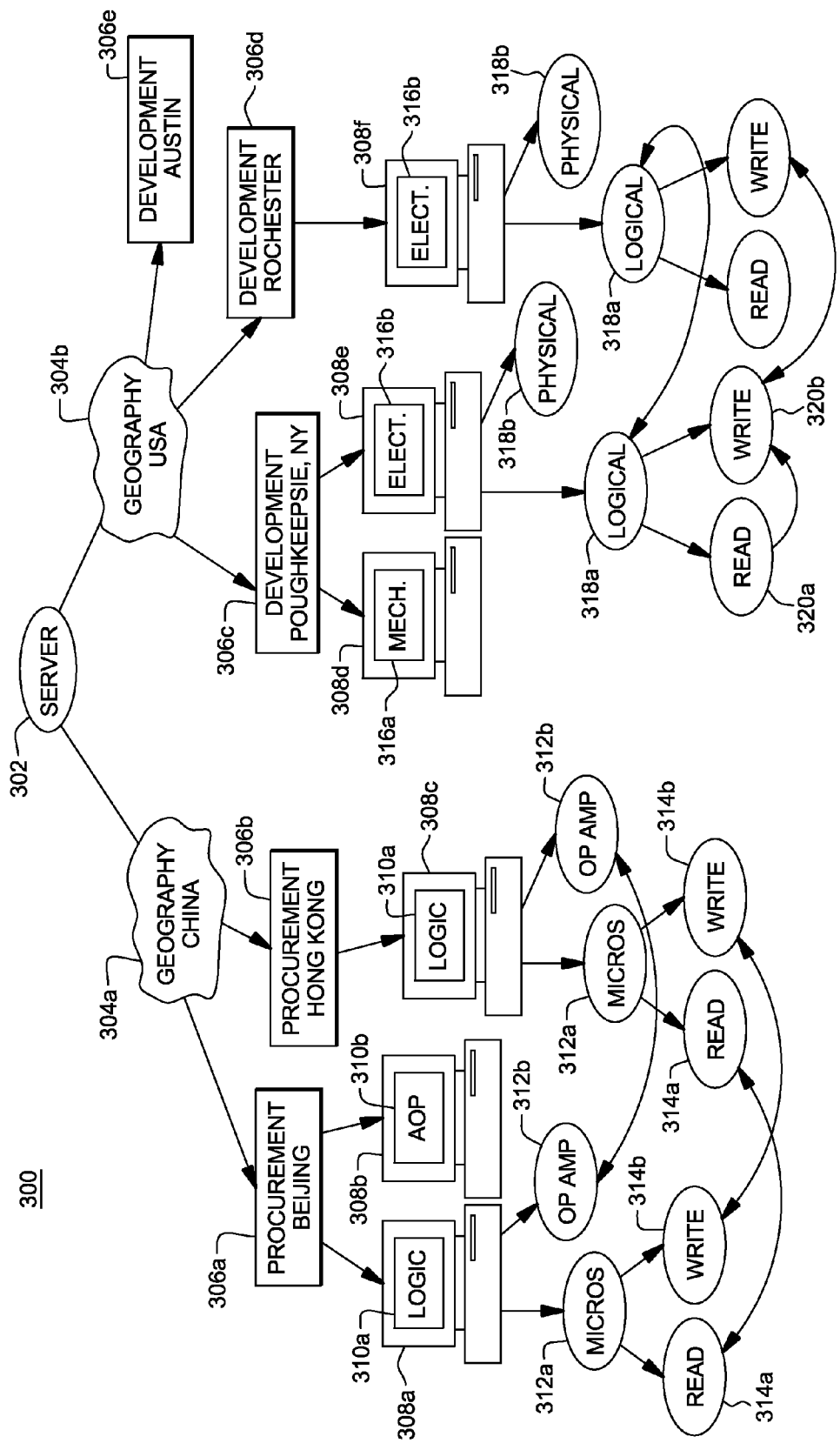
FIG. 3A depicts one embodiment of a computing environment to incorporate and use one or more aspects of the present invention.

One embodiment of a computing environment to incorporate and use one or more aspects of the present invention is depicted in FIG. 3A. As one particular example, computing environment 300 includes a hierarchical structure of nodes, in which node 302 is referred to as the central server. This server includes a complete data structure, parts of which are mapped onto other nodes of the environment. In one example, node 302 is coupled to a first cluster of nodes 304a and a second cluster of nodes 304b. In this example, each cluster of nodes includes one or more nodes storing data for a particular geography. For instance, cluster 304a includes one or more nodes storing data for the geographical location of China; and cluster 304b includes one or more nodes storing data for the geographical location of the USA. Further, in this particular example, cluster 304a is further coupled to clusters 306a and 306b. Cluster 306a includes one or more nodes caching data for procurement in Beijing, and cluster 306b includes one or more nodes caching data for procurement in Hong Kong. Similarly, cluster 304b is coupled to clusters 306c, 306d and 306e. Cluster 306c includes one or more nodes including data for development in Poughkeepsie; cluster 306d includes one or more nodes including data for development in Rochester; and cluster 306e includes one or more nodes including data for development in Austin, as examples.

Further, cluster 306a is coupled to client nodes 308a and 308b; and cluster 306b is coupled to client node 308c. At one particular point in time, client nodes 308a and 308c are accessing logic data 310a, and client node 308b is accessing AOP data 310b. Similarly, cluster 306c is coupled to client nodes 308d and 308e; and cluster 306d is coupled to client node 308f. Client node 308d is accessing mechanical data 316a, and client nodes 308e and 308f are accessing electrical data 316b. Cluster 306e in this example is not coupled to any client nodes.

Figure 3B:
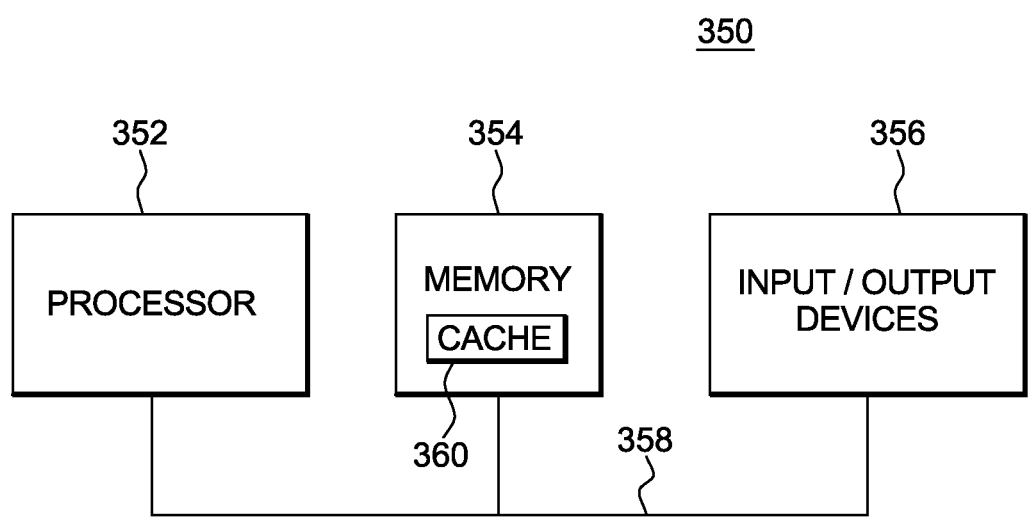
FIG. 3B depicts one embodiment of further details of a node of the computing environment of FIG. 3A, in accordance with an aspect of the present invention.

Each node of the environment is, for instance, a server, such as a System p®, System x®, or System z® server, offered by International Business Machines Corporation, or other type of machine. In one example, as shown in FIG. 3B, a node 350 includes, for instance, one or more processors 352, a memory 354, and one or more input/output (I/O) devices 356 coupled to another via one or more buses 358. Further, each node includes a local cache 360 for caching local data. The local cache may be in memory, the processor, or a combination of both, as examples. (System p®, System x® and System z® are registered trademarks of International Business Machines Corporation, Armonk, N.Y. Other names used herein may be registered trademarks, trademarks or product names of International Business Machines Corporation or other companies.)

In accordance with an aspect of the present invention, stored within each cache is an entire data structure or a portion thereof relevant to user requests. Since, in this example, the environment is hierarchical, the central server includes the entire data structure and the levels of nodes thereafter include increasingly specific portions of the data structure. Each of these portions is referred to as a substructure. For example, central server 302 (FIG. 3A) includes a cache having the entire data structure; in this case, an entire product lifecycle management data structure; and each node of, for instance, geography China 304a includes a cache having a portion of that data structure based on requests of users in China. For example, the caches in geography China are a superset of the caches in procurement Beijing and procurement Hong Kong. Similarly, each node in procurement Beijing 306a has a cache with the portion of the data structure relevant to users in procurement in Beijing, and each node in procurement Hong Kong 306B has a cache with that portion of the data structure relevant to users in procurement in Hong Kong. The caches in procurement Beijing are a superset of the caches for clients 308*a* and 308*b*; and the caches in procurement Hong Kong are a superset of its client's caches (e.g., client 308*c*).

Similarly, each node of geography USA 304*b* includes a cache having a portion of the central data structure relevant to users in the USA. The caches in geography USA are a superset of the caches in development Poughkeepsie, N.Y., development Rochester and development Austin. Further, each node in development Poughkeepsie, N.Y. 306*c* includes a cache having the part of the data structure relevant to users in development Poughkeepsie, N.Y.; each node in development Rochester 306*d* has a cache with the portion of the data structure relevant to users in development Rochester; and each node in development Austin 306*e* has a cache with the portion of the data structure relevant to users in development in Austin. (In another embodiment, the clusters may include nodes that do not include a portion of the data structure.)

Each of client nodes 308*a* and 308*c* includes a cache having a portion of the main data structure referred to as logic (310*a*). Logic 310*a* has two sub-components: micros 312*a* and op amp 312*b*. The operations that can be performed on these sub-components are read 314*a* and write 314*b*. Moreover, client node 308*b* includes a cache having a portion of the data structure, referred to as AOP (310*b*). Similarly, client node 308*d* includes a cache having a part of the data structure, referred to as mechanical 316*a*; and client nodes 308*e* and 308*f* each has a cache including a part of the data structure, referred to as electrical 316*b*. Sub-components of the electrical portion of the data structure include logical 318*a* and physical 318*b*. Again, read 320*a* and write 320*b* operations may be performed on these data structure portions. For instance, it will be noticed that 308*e* and 308*f* may use the same "logical" portion of the database and perform write operations 320*b* at the same time. This requires that consistency be maintained. Such operations are depicted by a linked double arrow-head across operations and clients.

Although the caches are described in terms of the data they cache, it is understood that, in one embodiment, the caches are not partitioned and placed by the system administrator, but instead, client access to data leads to accrual of data in these caches. As such, data in caches of nodes in, for instance, FIG. 3A reflect a snapshot of data in the caches, as clients access data from central server 302. For example, caches 304*a* and 304*b* cache data related to Geography China and Geography USA, respectively. Clients in Geography China needing access to Geography USA information are directed by server 304*a* to server 302 to access Geography USA information. Similar descriptions apply to the caches in the examples described herein. Further, clients across geographies (e.g., 304*a* and 304*b*) may access the same portion of a data structure as this may relate to, for instance, parts of a piece of equipment being built across geographies. Thus, it is likely that clients may need edit and read access to portions of the same data structure. Similarly, clients across development site Poughkeepsie 306*b* and Rochester 306*d* (e.g., clients 308*f* and 308*e*) may also need access to portions of the same data structure.

As shown, the environment is structured hierarchically, and therefore, the data structure, as a whole, can be observed from the bottom-up, in which the client nodes have the most specific substructure of the data structure (e.g., logic—micros, op amp; AOP mechanical; electrical—logical, physical); and their parents (e.g., 306*a*-306*e*) include those specific substructures, and may include additional data relevant for those parents (e.g., procurement, development), etc. A parent (i.e., the next higher node in the hierarchy) is referred to herein as a root node or root server. In this example, the caches, e.g., of FIG. 3A, are hierarchically inclusive. Server 306*a* is likely to include all the data accessed by client 308*a* and 308*b* in the recent past to preserve temporal and spatial locality. Further, in alternate embodiments, clients 308*a*, 308*b*, 308*c*, 308*d*, 308*e* and 308*f* may directly be connected to server 302 without any intervening server. In this case, a single client or a group of clients can be elected as a root/parent server. The ownership of the parent/root server may change periodically to allow efficient load balancing at a client.

Each of the substructures of the data structure has an association id associated therewith. This enables client nodes editing the same portion of a data structure be associated with the same association ID. This facilitates easily identifying and grouping clients that are editing the same portion of the data structure, and allows consistency to be maintained efficiently. The association id is, for instance, an alphanumeric id that is unique within a cluster of nodes. In one embodiment, the association id is built hierarchically. This is described further with reference to FIG. 4. In other embodiments, association ids can be built differently and have many different types of values.

Figure 4:
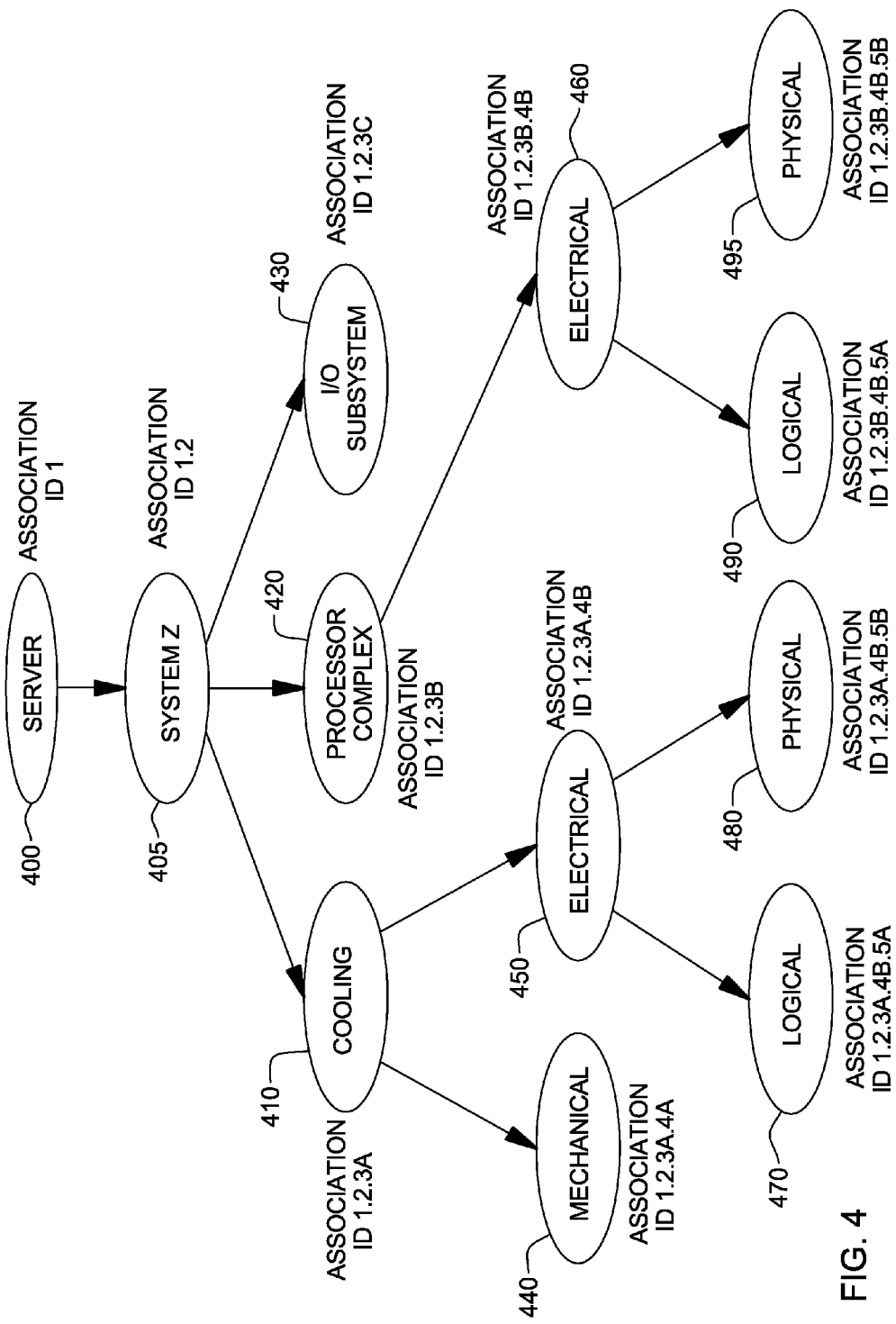
FIG. 4 depicts one embodiment of a data structure with corresponding association identifiers, in accordance with an aspect of the present invention.

With reference to FIG. 4, a pictorial depiction of association ids assigned to various substructures of the data structure are shown. Data may be extracted from tertiary storage and stored in memory in the form of the data structure of FIG. 4. This is performed by server 302 of FIG. 3A, as an example. Other nodes of FIG. 3A may also store portions of the data structure in the layout of FIG. 4. Although specific association ids are specified, these are just for clarification, and not necessarily the types of values used. This example refers to a parts data structure for a server.

As an example, a root node 400 of the data structure includes the portion of a main data structure relating to parts for a server and is assigned association id 1. It is coupled to a second-tier node (i.e., node of the tree) 405 that includes a portion of the data structure relating to System z® and is assigned an association id 1.2; third-tier node 410 includes a portion of the database relating to cooling for System z® and has an association id of 1.2.3A; node 420 includes a portion of the database relating to the processor complex for System z® and is assigned an association id of 1.2.3B; node 430 includes a portion of the database relating to the I/O subsystem of System z® and is assigned association id 1.2.3C. Fourth-tier node 440 includes a portion of the database relating to the mechanical subsystem of cooling for System z® and has an association id of 1.2.3A.4A; node 450 includes a portion of the database relating to the electrical subsystem of cooling for System z® and is assigned an association id of 1.2.3A.4B; node 460 includes a portion of the database relating to the electrical components of processor complex of System z® and is assigned an association id 1.2.3B.4B; fifth-tier node 470 includes a portion of the database relating to the logical components of the electrical subsystem for cooling for System z® and is assigned an association id of 1.2.3A.4B.5A; node 480 includes a portion of the database relating to the physical components of the electrical subsystem for cooling for System z® and is assigned an association id of 1.2.3A.4B.5B; node 490 includes the logical components of the electrical subsystem for the processor complex of System z® and is assigned an association id of 1.2.3B.4B.5A; and node 495 includes physical components of the electrical subsystem for the processor complex of System z® and is assigned an association id of 1.2.3B.4B.5B.

Figure 5:
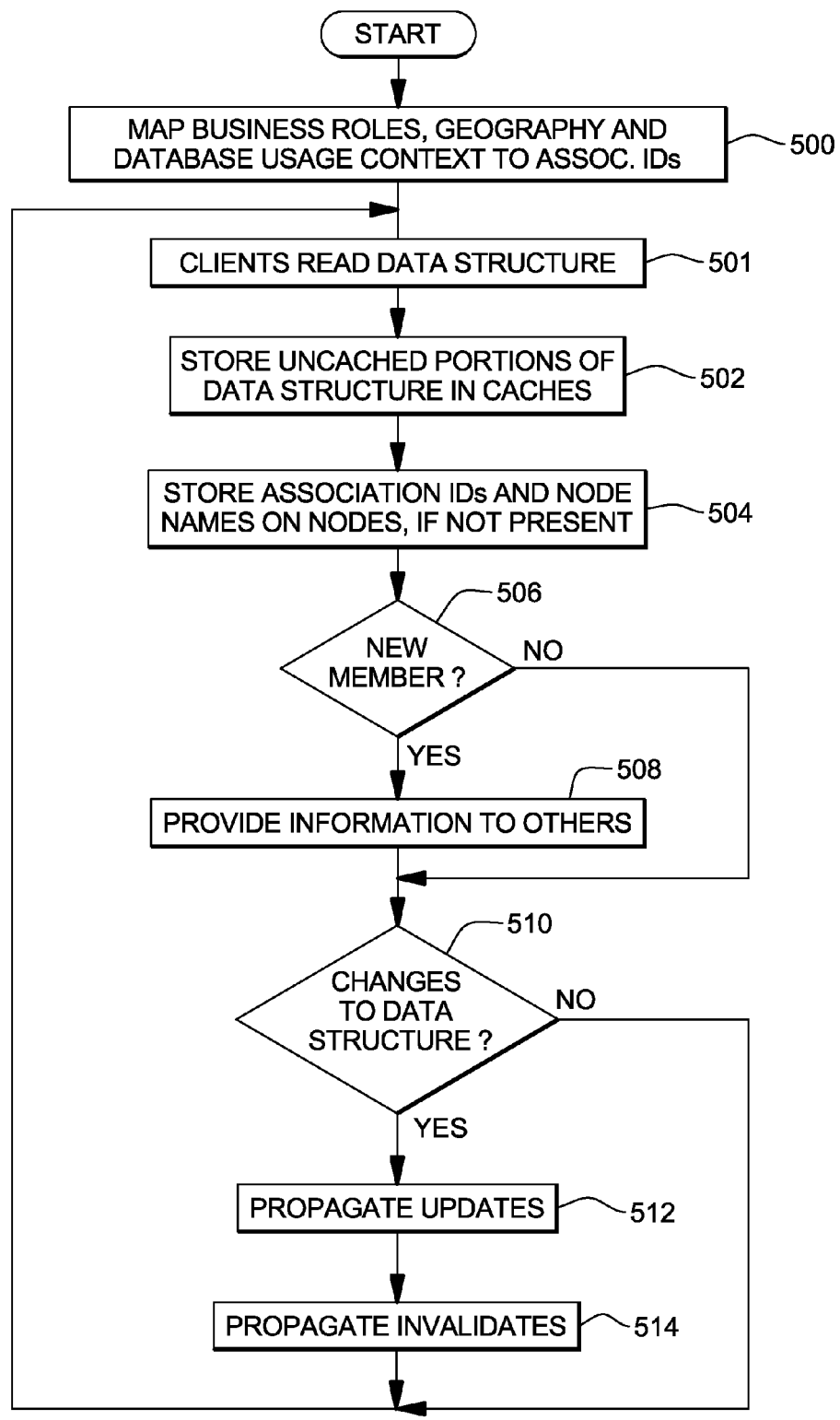
FIG. 5 depicts one embodiment of the logic to perform adaptive caching, in accordance with an aspect of the present invention.
Figure 6A:
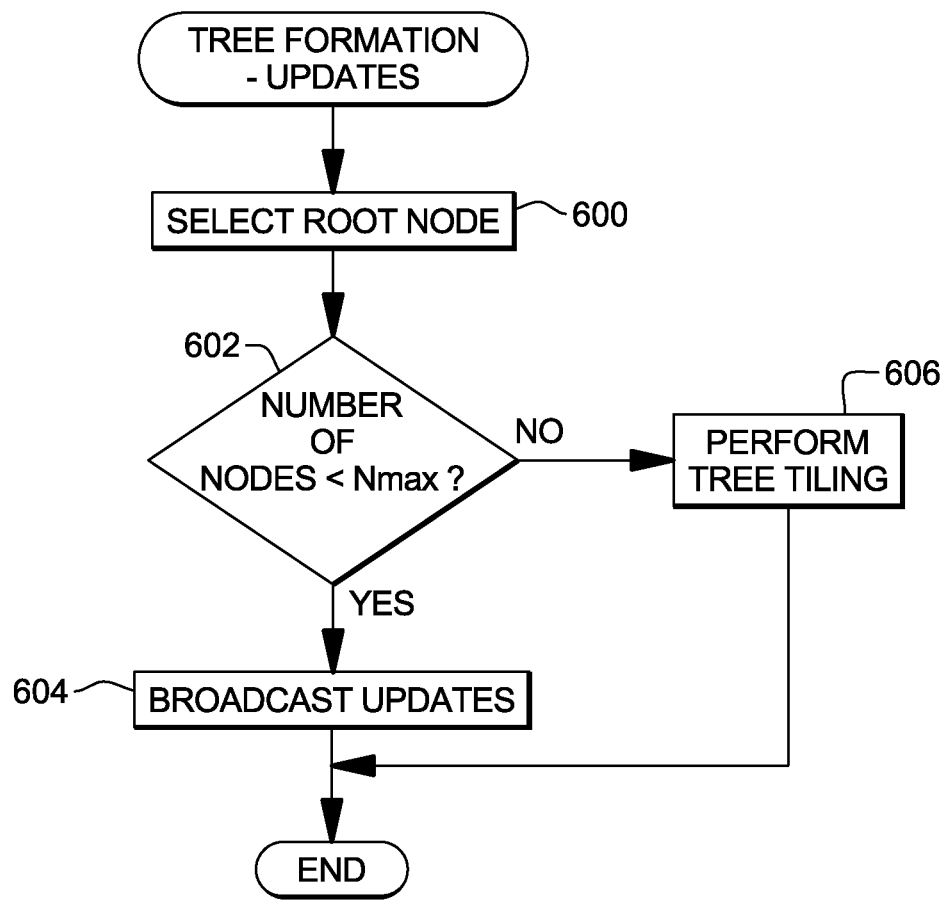
FIG. 6A depicts one embodiment of the logic to form a caching structure to be used to propagate updates, in accordance with an aspect of the present invention.
Figure 6B:
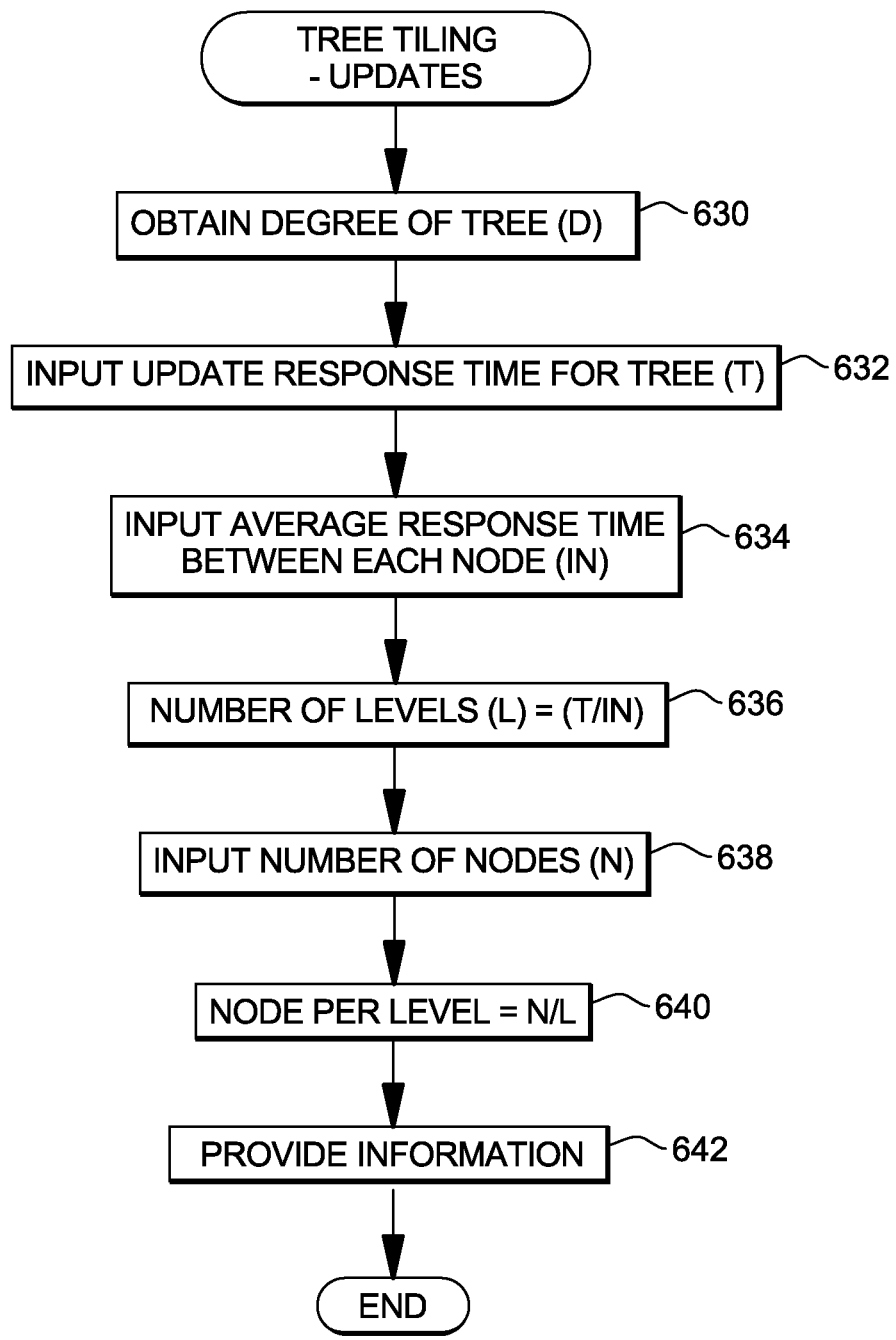
FIG. 6B depicts one embodiment of the logic associated with a tree tiling technique used to propagate updates, in accordance with an aspect of the present invention.
Figure 6C:
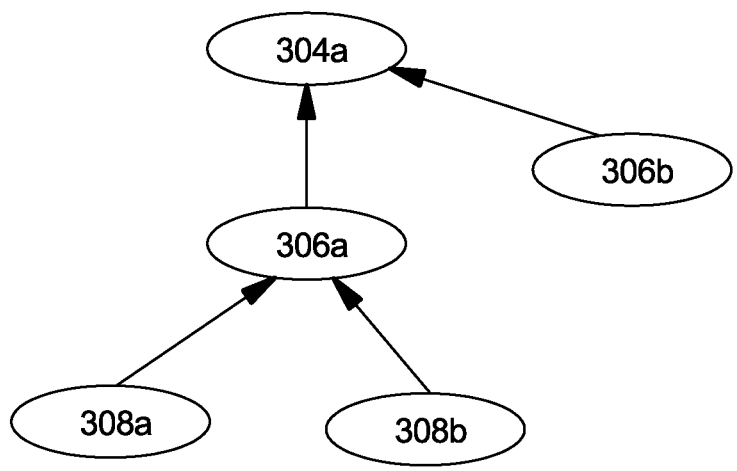
FIG. 6C depicts one embodiment of an update caching structure, in accordance with an aspect of the present invention.
Figure 7A:
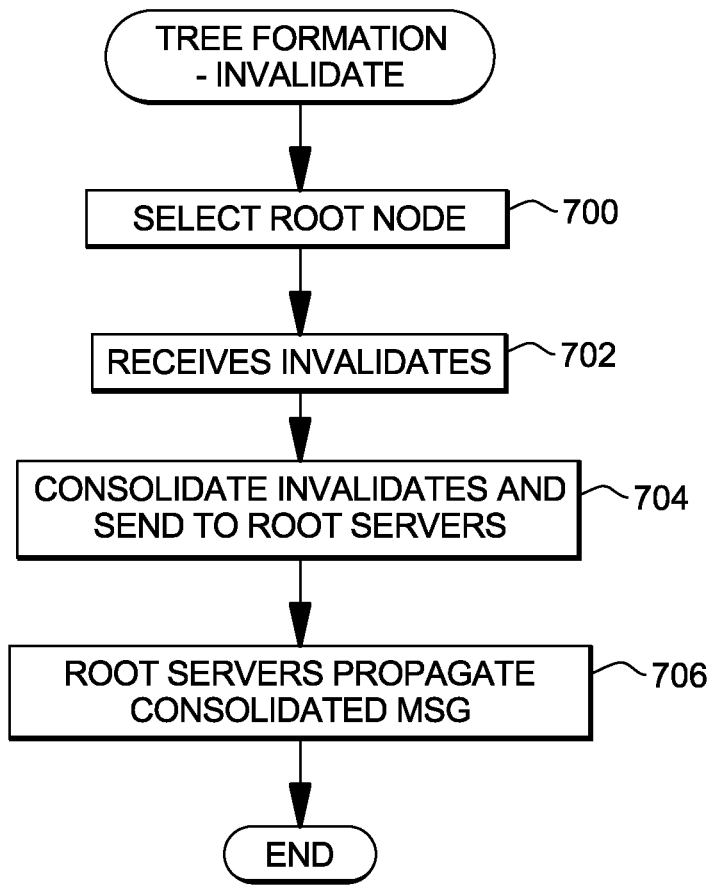
FIG. 7A depicts one embodiment of the logic to form a caching structure to be used to propagate invalidates, in accordance with an aspect of the present invention.
Figure 7B:
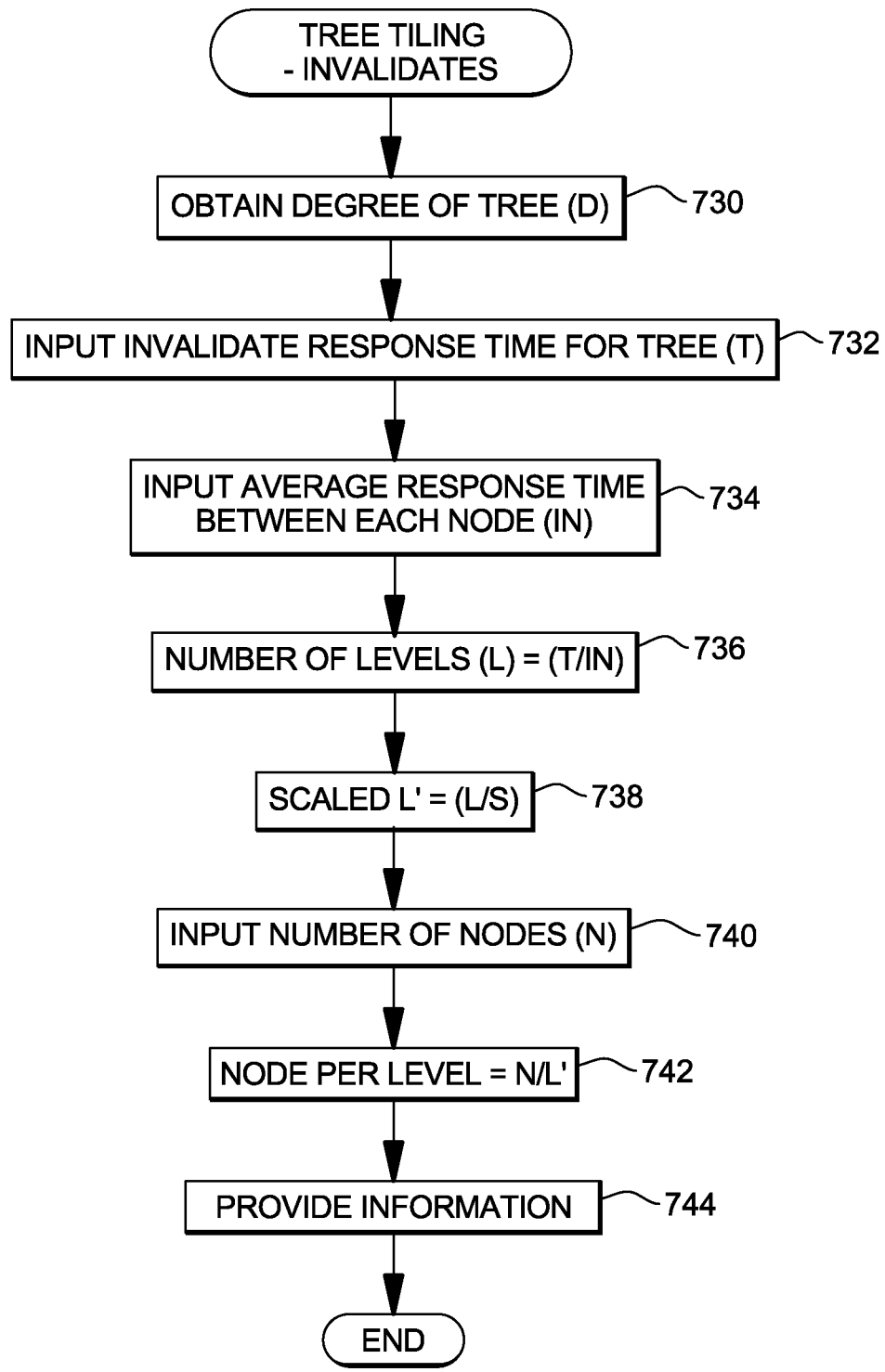
FIG. 7B depicts one embodiment of a tiling technique to be used to propagate invalidates, in accordance with an aspect of the present invention.
Figure 7C:
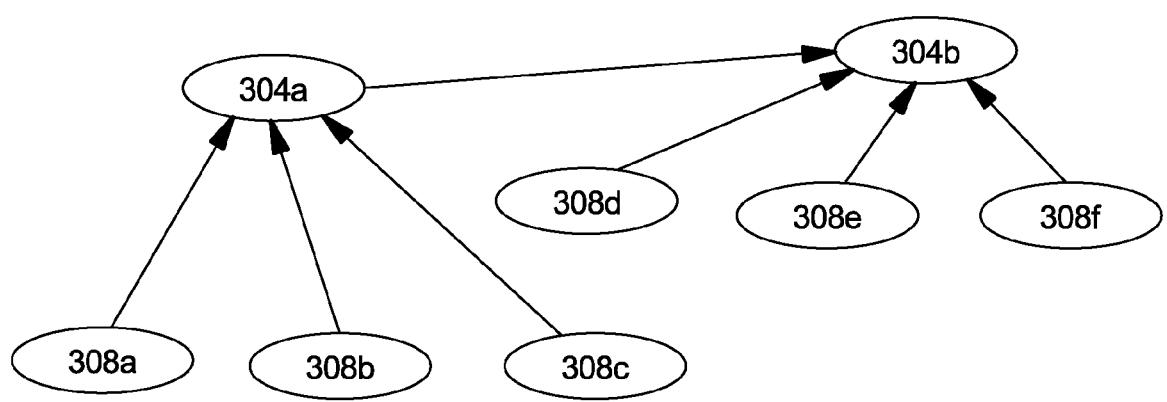
FIG. 7C depicts one embodiment of an invalidate caching structure, in accordance with an aspect of the present invention.

These association ids are used in determining which client machine caches are to be included (e.g., dynamically) in the various caching structures created to manage the caches and consistency of data in the central data structure. Each caching structure is, for instance, a distributed caching structure that represents a grouping of distinct client machine caches with the same or different association identifiers depending on the chosen sharing context. For example, responsive to a sharing context in which clients having data structures with the same association id are grouped together, the caches having a same chosen association id are included in an update caching structure, and those different from that id are part of an invalidate caching structure. The rationale is that client machines with the same association identifier are accessing the same portion of the data structure and are likely to need data in the near future. Thus, updating all clients within the same association ID with the exact value of the change in data structure elements is beneficial. This reduces response time for client machines accessing the same portion of the data structure (same association id). Client machines outside an association are sent invalidate messages. The rationale is that client machines outside the association are accessing different portions of the data structure (or need only read access to the same portion of the data structure) and are likely not to need updated values to data structure elements immediately. Sending invalidate messages marks this data as "stale" in a client cache so that a client machine may read data from a parent server when actually needed. The logic employed to create these caching structures is described herein with reference to FIGS. 5-7C. In particular, FIG. 5 depicts one embodiment of the logic to assign the association ids, distribute those ids and handle changes to the caches. FIGS. 6A-6C depict examples of creating update caching structures; and FIGS. 7A-7C depict examples of creating invalidate caching structures.

Referring to FIG. 5, certain initialization and further updating are performed in order to build the adaptive caching structures. In one example, initially, the central server maps the business roles, geography and/or database usage context to the association ids, STEP 500. This is where the data structure is subdivided as desired by, for instance, the database or system administrator, and association ids are assigned to the different substructures. For instance, for the server parts example, the root of the data structure corresponding to the server is assigned association id 1, the portion of the data structure for System z® is assigned 1.2, cooling is assigned 1.2.3A, etc.

FIG. 4 describes association ids being mapped to portions of the central server data structure. It is also possible to have business roles associated with association IDs. For instance, in FIG. 3A, a procurement specialist (with business role id 6) can be using client station 308a. Assuming this specialist is at a portion of the data structure with association id a.b.c.d, the so called "effective" association id is a.b.c.d appended with 6 (id of the business role), i.e., a.b.c.d.6. If another procurement specialist is using client station 308c and assuming the specialist is also using the same portion of the data structure as client station 308a, then the "effective" association id is a.b.c.d.6. Thus, 308a and 308c have the same association id "a.b.c.d.6" and can be grouped as part of the same association or group. However, if in a further example, an accounting specialist (with business role id 8) is accessing the same portion of the data structure (a.b.c.d) at 308b, the effective association id is a.b.c.d.8. This specialist is in a group different from 308a and 308c, although 308b is accessing the same portion of the data structure.

Continuing with FIG. 5, one or more clients read the data structure, STEP 501, and the relevant uncached portions of the data structure, along with the association ids, are stored on the appropriate nodes, STEP 502. For example, for a particular node, its relevant portion is stored to the cache, in response to a request (e.g., cache read/write miss). In a further example, the relevant portion may be preloaded. Preloading is based, for instance, on user preferences or a system can learn from previous usage and load the databases offline (e.g., overnight).

Along with providing a node with the relevant portion of the database, it is also provided a name/id data structure (e.g., table, list, other structure) that includes all the nodes that have data cached thereon with the same association id, STEP 504. For instance, assume with reference to FIG. 3A that client node 308f has just accessed electrical data for a part in a parts database, and the electrical data has an association id of x.y.z. Further, assume in this example snapshot that node 308e requests access to electrical data for editing the same part that 308f has accessed. Nodes 308e and 308f are thus members of the same association with the same association id. When node 308e accesses electrical data, it receives a message from server 306c with an association id corresponding to the electrical data segment of the data structure. It also receives the list of machine names using the same electrical data structure segment, in this case, node 308f. It will be noted that server 302 may decide that a particular machine is too distant from a group of machines in a particular association to allow efficient communication of updates. In this case, server 302 sends, for instance, a NAK (negative acknowledgment) bit embedded in the association id request response when a user navigates to part of the data structure. When this is received, the machine may only have read access to part of the data structure and will not have access to edit/update/delete capabilities. The server may notify the machine "on hold" at a later time using a callback. Alternatively, the client machine denied edit access may request participation in an association at a later time by periodic polling.

Returning to FIG. 5, thereafter, if a new node is added to the association group, its identity is to be propagated to the other members of the group. Thus, a request is received at a server (e.g., 306c) from a client node (e.g., 308d) to access a particular portion of data. The server provides the data along with the association id. Further, the server (e.g., server 306c) determines if the node is already part of the group. The server maintains a table of association ids and machine names. If the machine name is not listed against the association id, then it is deemed a newly requesting member, INQUIRY 506. Otherwise, the node is already known. Processing then continues at INQUIRY 510, as described below.

However, if it is a new member, then, in one example, the information regarding this new member is provided to other nodes within the computing environment, STEP 508. This can be accomplished in a number of ways and under various circumstances. For instance, in response to making an edit request, the parent of the new member, which is a root server, determines that it is a new member, as described above. If the nodes of the group are already tiled, as described below, the root server maintains a tiled status flag and provides that tiled status flag and enumerated tree structure to the new member. The new member checks if the tiled status flag is set. If the tiled status flag is not set, then the new member broadcasts its information to the nodes on the name/id data structure. However, if the tiled status flag is set, the new member sends information and interest to join the group to its new parent using the tree enumerated structure, which uses the tree structure to disseminate the information. The root server can retile, if needed at periodic intervals for load balancing.

In addition to the above, whenever changes to a portion of the data structure occur, the other nodes caching the data structure need to be notified of these changes. Thus, a determination is made by a client, (e.g., nodes 308*d* or 308*e* of FIG. 3A, in this particular example), as to whether a change has been made to the data structure, INQUIRY 510. If not, processing continues at INQUIRY 501. Otherwise, if an update has been performed to a local cache, that update is propagated to caches that belong to the same association id as the cache being updated, STEP 512. In order to perform this update operation, a caching structure is created (e.g., dynamically) by a root server, as described with reference to FIGS. 6A-6C. Further, in this example, for those caches having association ids that differ from the association id of the cache being updated, an invalidate message is sent, STEP 514. One embodiment of this logic is described in further detail with reference to FIGS. 7A-7C.

Referring to FIG. 6A, one embodiment of the logic of forming a caching structure (e.g., a tree) for an update operation is described. Initially, a root node is selected, STEP 600. In one example, the node selected to be the root node is a parent server of the client node updating the cache. In another example, it is the client performing the update or, another client in a group of clients.

Thereafter, a determination is made as to whether there is a small number of nodes (Nmax) to which the update is to be broadcast. The number "Nmax" is chosen, for instance, by a designer, and can be any desired number (e.g., 100, 1000). This determination is made by referring to the name/id data structure stored on the root node that includes the names of the nodes and associated ids. If the number of nodes to receive the broadcast (i.e., the number of nodes having the same association id as the portion of the data structure being updated) is less than Nmax, INQUIRY 602, then the updates are broadcast by the client performing the update, STEP 604. Otherwise, a tree tiling technique is performed, STEP 606, as described with reference to FIG. 6B. In one example, tree tiling is used within a geographical boundary chosen, for instance, by a designer.

Referring to FIG. 6B, one embodiment of the logic to build an update caching structure when the number of nodes in the broadcast is greater than Nmax is described. As one example, this logic is performed by a selected node (e.g., a parent node of the client updating its cache; the client node; another client node or another server). Initially, a degree of tree (D) chosen by, for instance, a designer or run-time system is input to the logic, STEP 630. Further, the permissible update response time for the entire tree (T) is input, STEP 632, as well as the measured average response time between each node in the cluster (IN), STEP 634. Thereafter, the number of levels (L) is set equal to T divided by IN, STEP 636. Further, the number of nodes having the chosen association id is input, STEP 638, and node per level is set equal to N/L, STEP 640. The root node (selected node) then sends the information pertaining to the structure of the tree to the entire set of nodes so that each node knows its parent to communicate with, STEP 642.

In one embodiment, the update cache structure includes those nodes that have update access to the same portion of the data structure (i.e., those nodes that include the portion of the data structure with the same association id). However, in a further embodiment, a client machine may choose to employ a speculative request. For instance, when a user is reading a portion of a database, the client system may decide that the user may need access for editing the portion of the database soon. The client system may issue a "speculative" edit request. The request is tagged with a "speculative" bit in the request to the root server. This allows the root server to prioritize membership based on normal or speculative requests. When a speculative membership is allowed by the root server, the client system is added to a caching structure for editing, even though the user was only accessing a portion of the database for reads. This can hide edit membership join response time from the user completely.

One example of an update caching structure is shown in FIG. 6C, which lists nodes from FIG. 3A. In this particular example, it is assumed that each node included in the structure has update access to a portion of the database with the same chosen association identifier. With this example, node 304*a* is chosen as the root node. Nodes 308*a* and 308*b* send their updates to node 306*a*. Node 304*a* combines updates from nodes 306*a* and 306*b*. Node 304*a* then sends pairwise merged updates (from all nodes) to its children, its children then send merged updates to their children and so on. This can be more efficient than flooding messages using an all-to-all broadcast when the number of nodes is large.

Although, in this example, updates are distributed to those caches having the same association id as the one being updated, in accordance with an aspect of the present invention, invalidate messages are sent to those caches having other than that association id to ensure that outdated data is not used (also, in other embodiments, other caches may also be included, such as those with the same association id but with only read access). A client reading outdated data that has been invalidated will incur a "read miss" and will eventually read fresh data. One example of creating the caching structure to disseminate the invalidate message is described with reference to FIG. 7A. Initially, a root node is selected to compute the invalidate operation graph, STEP 700. In one example, the node selected to be the root node is a parent of the client node updating the cache. In another example, it is the client updating the cache, another client, or another server. Further, a set of server/client machines may also be chosen as the root. Since the set of client machines can change ownership over time based on client acceptance, they are referred to as a virtual root server. This is adopted, for instance, when a set of clients does not have a server, but communicates with, a server directly; e.g., nodes 308*a* and 308*b* communicate directly with server 302.

The selected root server receives an invalidate message from each client machine for which it is the root, STEP 702. The root server consolidates the invalidates, and broadcasts the invalidates to other root servers, STEP 704. The root servers then propagate the consolidated invalidate message to their children, STEP 706. As examples, a simple broadcast may be used or a tree tiling technique may be used. One example of the tree tiling technique is described with reference to FIG. 7B.

Referring to FIG. 7B, initially, the degree of tree (D) chosen by, for instance, the designer or runtime system is input, STEP 730. Thereafter, the permissible invalidate response time for the entire tree (T) is input, STEP 732, as well as the measured average response time between each node (IN), STEP 734. The number of levels (L) is set to T/IN, STEP 736. Further, a scaling factor, L', is set equal to L/S, where S is chosen by, for instance, a designer, STEP 738. Then, the number of nodes to receive the invalidate message (e.g., those nodes having a different association id from the cache being updated) is input, STEP 740, and the nodes per level is set equal to N/L', STEP 742. The graph structure (as, for instance, a list) of the invalidate tree is sent to each node by the root server so each node knows its parent with which to communicate, STEP 744. Then, when a client reads an invalidated portion of the data structure, it will access that portion from a server, rather than its local cache.

One example of an invalidate tree is depicted in FIG. 7C. In this example, reference is made to FIG. 3A. For instance, nodes 308*a*, 308*b* and 308*c* send invalidate messages to node 304a via, for instance, nodes 306a, 306b. It will be understood that these could pertain to different portions of a data structure, e.g., nodes 308a, 308b and 308c could belong to different associations. Node 304a consolidates these messages and then sends a consolidated invalidate message to node 304b. Node 304b in the interim has consolidated invalidate messages from nodes 308d, 308e and 308f. Node 304b merges invalidate messages from node 304a and sends a merged invalidate message down the tree by sending messages to its children. The children at each level send an invalidate message to each of its children until all nodes are reached. This allows invalidate messages from all nodes to be communicated with an efficient number of messages. It is understood that invalidate messages can be supported in trees with a larger degree (number of children attached to a parent) than the degree of update tree with the same number of nodes. This is because each invalidate message is shorter than an update message to the same portion of a data structure. This allows a parent in an invalidate tree to process messages from a larger number of children more efficiently than a counterpart parent in an update tree. This is one reason for using a scaling factor (see, e.g., FIG. 7B) in the invalidate tree formation technique. The invalidate tree can support a higher number of nodes per level (than an update tree, for the same number of nodes), which is one reason why a scaling factor is used to reduce the number of levels of an invalidate tree and increase the corresponding nodes per level.

Described in detail above are adaptive caching structures (e.g., distributed caching structures) created and used to maintain consistency of local caches. Members of a caching structure depend on a sharing context. In one particular example, an update structure is used to update caches having a same association id; and another structure, an invalidate structure, is used to indicate to caches having other association ids that a cache has been updated. These caching structures are adaptively built depending on the caches that are to be included, which dynamically change as nodes are added/deleted and/or depending on access. Each caching structure may change its degree based on membership and/or the need to optimize message routing. (A client may perform steps to remove itself from the association. For instance, after a designer chosen period of time, a client may send a request to delete itself. This change in membership is propagated similar to adding a new member.)

As examples, clients in the same association use the update protocol. This is because clients in the same association may belong to the same business role and geography and are working on the same segments of the cached data structure. They benefit from instantly updated values. Clients in different associations or that belong to different business roles and geographies use invalidates to signal data structure changes. This is because clients in different geographies are likely to be using different parts of the data structure and do not need instant updates.

Other embodiments are also possible. For example, assume that there are different geographies, and clients of one geography use one data structure (or one part of a data structure) and clients of another geography use another data structure (or another part of the data structure). In this example, if an update is made in the one geography, then an update cache structure (e.g., tree) is used to provide the update to members of the update cache structure; however, in this embodiment, an invalidate cache structure is not needed at the one geography. Clients with read access in the one geography receive updates along with clients having edit access. Since the other geography does not update the same data, it is unnecessary to send updates to that geography, and thus, at the root, the update is converted to an invalidate. The converted invalidate is provided to the other geography, which does use an invalidate cache structure to propagate the invalidate. In one example, converting the update to an invalidate includes, for instance, changing the type code of the message to invalidate and including a pointer to the data structure (instead of including the updated data). This conversion saves bandwidth as invalidates do not carry the updated value of data in the nodes of the data structure.

A distributed caching structure may be used to implement a variety of data operations and coherency protocols. For example, a client may choose to have exclusive access to a portion of the data structure and it can request access by cooperative involvement of other clients in the association. The client would make a request using an identifier related to the portion of the database along the distributed caching structure to each client. The root server would coalesce acknowledge messages from each client and then send an exclusive grant message to the node requesting exclusive access to a portion of the database. The client would send a release message to each client when it does not need exclusive access anymore. Such messages can be piggybacked on other data packets for messaging efficiency.

Distributed caching structure networks may be implemented as "in-band" (best-effort) or "out-of-band" (resource reserved) networks. An "in-band" caching structure network carries update information along with other traffic. An "out-of-band" caching structure network is dynamically created when the caching structure is formed and reserves bandwidth and resources in the network for all the member clients to communicate using separate lanes for caching traffic network. This ensures that clients can make rapid updates to same portions of a data structure and receive them in a timely fashion even across distant geographies without being delayed by competing network traffic. This allows real-time data collaboration to be achieved in an efficient manner.

Although, in one example, this technique is used for product life cycle management databases, it is extendable to other types of databases and other industries. In one example, the databases supported have inheritance and polymorphic relationships between the components in the database, and may allow custom/manual inheritance (object-oriented). Databases may also be non-hierarchical in nature (e.g. lists). A root server can also preallocate a caching structure for predetermined collaborative work between a group of clients. Clients may express their interest in a collaborative work offering based on a set of database portions. Before the collaborative work session begins, caching structures are pre-allocated based on client expression of interest. This obviates the need for caching structure setup time and caching structure join time. Alternatively, a root server may instruct a group of clients to work on portions of a data structure to complete a collaborative work request. The caching structure could also be preallocated in this case for performance, efficiency and resource access guarantees.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
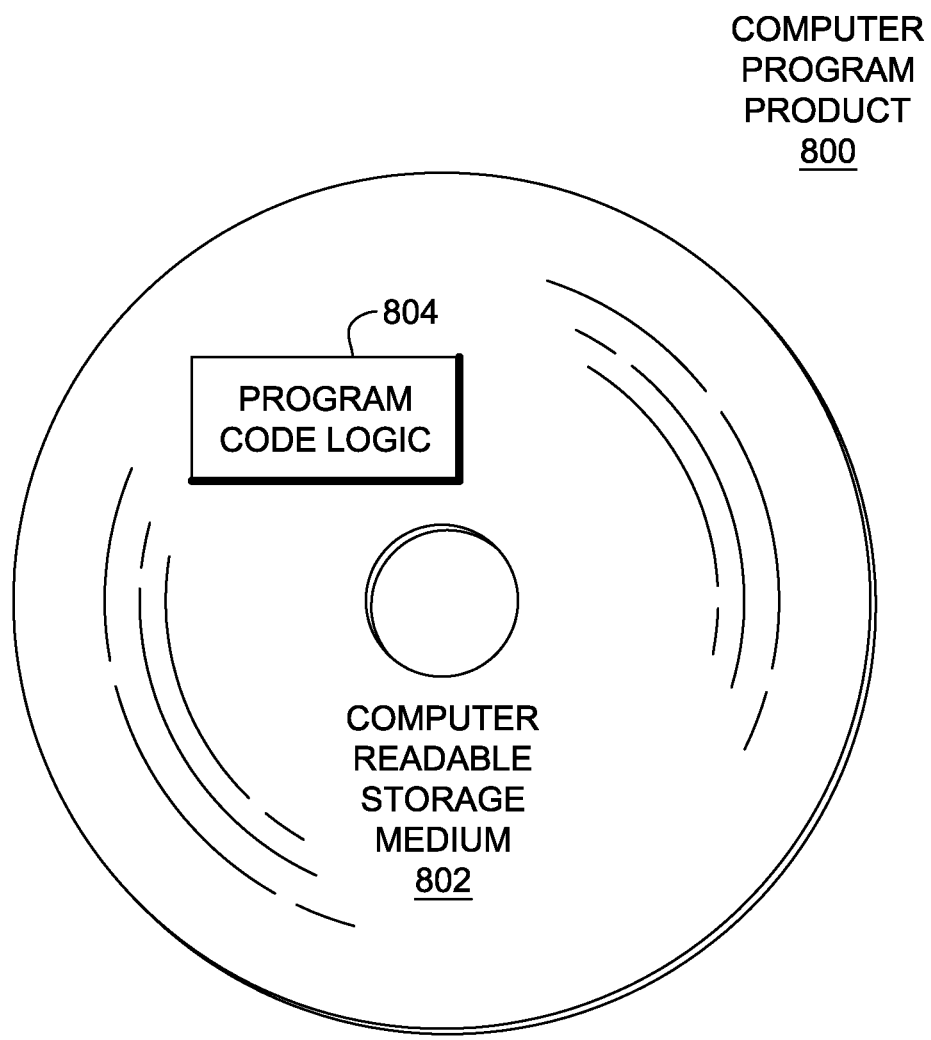
FIG. 8 depicts one embodiment of a computer program product incorporating one or more aspects of the present invention.

Referring now to FIG. 8, in one example, a computer program product 800 includes, for instance, one or more computer readable media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of databases and other data structure may be used. The ids may take a different format or have other values. Further, other data dissemination techniques may be used. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating data access in a computing environment, the computer program product comprising:
    a non-transitory storage medium readable by a processing circuit and storing instructions for execution by the processing circuit for performing a method comprising:
    adaptively creating caching structures usable in communicating with a plurality of caches of the computing environment, the plurality of caches to be included in the caching structures being selected based on one or more data sharing contexts, and wherein each of the caching structures are exclusively used for one type of operation of a plurality of types of operations, and wherein the caching structures comprise an update caching structure to provide cache updates and an invalidate caching structure to provide cache invalidates; and
    using the caching structures to provide an indication of a change to the plurality of caches, wherein the indication is based on a type of the caching structure;
    wherein the one or more data sharing contexts are based on an association identifier of a cache being updated; and
    wherein the update caching structure is used to provide an update to the plurality of caches of the update caching structure having the association identifier of the cache being updated, and the invalidate caching structure is used to provide an invalidate to the plurality of caches having an association identifier different than the association identifier of the cache being updated.

2. The computer program product of claim 1, wherein a data sharing context of the one or more data sharing contexts comprises the association identifier of the cache being updated, and the update caching structure provides an update to the plurality of caches having that association identifier.

3. The computer program product of claim 1, wherein a data sharing context of the one or more data sharing contexts comprises a selected access control.

4. The computer program product of claim 1, wherein a data sharing context of the one or more data sharing contexts comprises a chosen association identifier, the chosen association identifier being for a selected business role.

5. The computer program product of claim 1, wherein a data sharing context of the one or more data sharing contexts comprises association identifiers other than the association identifier of the cache being updated.

6. The computer program product of claim 5, wherein the indication comprises an invalidate of at least a portion of the plurality of caches, wherein the invalidate caching structure provides an invalidate to the plurality of caches having an association identifier different than the association identifier of the cache being updated.

7. The computer program product of claim 1, wherein the adaptively creating is performed based on a request to update a cache satisfying a data sharing context of the one or more data sharing contexts.

8. The computer program product of claim 1, wherein the adaptively creating is performed based on a prospective update of caches satisfying a data sharing context of the one or more data sharing contexts.

9. The computer program product of claim 1, wherein a cache of the plurality of caches includes at least one of an entire data structure or a portion of the entire data structure, wherein the data structure comprises a plurality of portions, and wherein the method further comprises assigning an association identifier to each portion of one or more portions of the plurality of portions.

10. The computer program product of claim 1, wherein the adaptively creating comprises including in a caching structure of the caching structures a cache based on speculation that the cache will be updated within a defined amount of time.

11. The computer program product of claim 1, wherein at least one cache of the plurality of caches utilizes a caching structure of the caching structures to determine at least one other cache of the plurality of caches to which an indication of the change is to be provided.

12. The computer program product of claim 1, wherein a caching structure of the caching structures comprise a hierarchical data structure comprising a hierarchy of parent and child nodes for propagating the indication of the change to the plurality of caches.

13. A computer system for facilitating data access in a computing environment, the computer system comprising:
    a memory; and
    a processor in communications with the memory, wherein the computer system is capable of performing a method, said method comprising:
    adaptively creating caching structures usable in communicating with a plurality of caches of the computing environment, the plurality of caches to be included in the caching structures being selected based on one or more data sharing contexts, and wherein each of the caching structures are exclusively used for one type of operation of a plurality of types of operations, and wherein the caching structures comprise an update caching structure to provide cache updates and an invalidate caching structure to provide cache invalidates; and
    using the caching structures to provide an indication of a change to the plurality of caches, wherein the indication is based on a type of the caching structure;
    wherein the one or more data sharing contexts are based on an association identifier of a cache being updated; and
    wherein the update caching structure is used to provide an update to the plurality of caches of the update caching structure having the association identifier of the cache being updated, and the invalidate caching structure is used to provide an invalidate to the plurality of caches having an association identifier different than the association identifier of the cache being updated.

14. The computer system of claim 13, wherein a data sharing context of the one or more data sharing contexts comprises association identifiers other than the association identifier of the cache being updated.

15. The computer system of claim 13, wherein the adaptively creating is performed based on a prospective update of caches satisfying a data sharing context of the one or more data sharing contexts.

16. The computer system of claim 13, wherein a cache of the plurality of caches includes at least one of an entire data structure or a portion of the entire data structure, wherein the data structure comprises a plurality of portions, and wherein the method further comprises assigning an association identifier to each portion of one or more portions of the plurality of portions.

17. The computer system of claim 13, wherein the adaptively creating comprises including in a caching structure of the caching structures a cache based on speculation that the cache will be updated within a defined amount of time.

18. A method for facilitating data access in a computing environment, the method comprising:
    adaptively creating, by at least one processor of the computing environment, caching structures usable in communicating with a plurality of caches of the computing environment, the plurality of caches to be included in the caching structures being selected based on one or more data sharing contexts, and wherein each of the caching structures are exclusively used for one type of operation of a plurality of types of operations, and wherein the caching structures comprise an update caching structure to provide cache updates and an invalidate caching structure to provide cache invalidates; and
    using the caching structures, by one or more processors, to provide an indication of a change to the plurality of caches, wherein the indication is based on a type of the caching structure;
    wherein the one or more data sharing contexts are based on an association identifier of a cache being updated; and
    wherein the update caching structure is used to provide an update to the plurality of caches of the update caching structure having the association identifier of the cache being updated, and the invalidate caching structure is used to provide an invalidate to the plurality of caches having an association identifier different than the association identifier of the cache being updated.

19. The method of claim 18, wherein a data sharing context of the one or more data sharing contexts comprises a chosen association identifier.

20. The method of claim 18, wherein the adaptively creating is performed based on a prospective update of caches satisfying a data sharing context of the one or more data sharing contexts.

* * * * *